(12) United States Patent
Hsieh

(10) Patent No.: US 9,121,777 B2
(45) Date of Patent: Sep. 1, 2015

(54) THREADED MEMBER CAPABLE OF DETECTING TENSION

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 0 days.

(21) Appl. No.: 14/187,592

(22) Filed: Feb. 24, 2014

(65) Prior Publication Data

US 2014/0283617 A1    Sep. 25, 2014

(30) Foreign Application Priority Data

Mar. 25, 2013   (TW) .............................. 102110506 A

(51) Int. Cl.
| | |
|---|---|
| *G01L 5/24* | (2006.01) |
| *G01L 5/00* | (2006.01) |
| *F16B 31/02* | (2006.01) |
| *B25B 23/14* | (2006.01) |

(52) U.S. Cl.
CPC .................. *G01L 5/00* (2013.01); *F16B 31/025* (2013.01); *G01L 5/243* (2013.01); *B25B 23/14* (2013.01); *F16B 2031/022* (2013.01); *G01L 5/24* (2013.01)

(58) Field of Classification Search
CPC ........... G01L 5/24; G01L 5/246; G01L 23/14; B25B 23/14

USPC ........................................................... 73/761
See application file for complete search history.

(56) References Cited

U.S. PATENT DOCUMENTS

| | | | | |
|---|---|---|---|---|
| 5,629,487 A * | 5/1997 | Mucke et al. | ................... | 73/818 |
| 6,643,045 B2 * | 11/2003 | Fujita et al. | ................ | 359/213.1 |
| 7,340,960 B2 * | 3/2008 | Niblock | ........................... | 73/760 |
| 7,350,420 B2 * | 4/2008 | Burmann | ........................ | 73/761 |
| 2012/0185002 A1 * | 7/2012 | Hsieh | ........................... | 606/315 |

FOREIGN PATENT DOCUMENTS

JP            06221315       *   9/1994

OTHER PUBLICATIONS

U.S. Appl. No. 14/161,307, Kabo Tool Company.

* cited by examiner

*Primary Examiner* — Lisa Caputo
*Assistant Examiner* — Nathaniel T Woodward
(74) *Attorney, Agent, or Firm* — Guice Patents PLLC

(57) ABSTRACT

A threaded member has an axial direction. A thread is formed on the threaded member in the axial direction. At least one receiving recess is formed on a circumferential surface of the thread of the threaded member. At least one sensor member is disposed in the receiving recess for detecting tension applied to the threaded member in the axial direction. When a tightened article is tightened by the threaded member, an extension force/tension is applied to the threaded member in the axial direction. The sensor member is positioned in adjacency to the thread of the threaded member so that the sensor member can precisely detect the extension extent of the threaded member for precisely obtaining the tightening force applied to the threaded member.

8 Claims, 11 Drawing Sheets

THREADED MEMBER CAPABLE OF DETECTING TENSION

BACKGROUND OF THE INVENTION

1. Field of the Invention

The present invention relates generally to a threaded member, and more particularly to a threaded member, which is capable of detecting the axial extension force/tension applied to the threaded member when an article is tightened with the threaded member.

2. Description of the Related Art

It is well known that threaded members such as bolts, screws and nuts are widely used in various fields for fixedly connecting two (or more) articles with each other, (such as mechanical equipments, sophisticated instruments, construction engineering, etc.) The threaded members can be easily screwed and tightened to fixedly connect the articles with each other. However, in the case that the threaded members are applied to those high-science/technology instruments requiring high precision or applied to construction engineering requiring high security, in addition to fixed connection between the connected sections, the threaded members are further required to tighten the connected sections of the articles by precise tightening force. In case the threaded members are under-tightened or over-tightened, not only the design requirement cannot be satisfied, but also the use effect and security of the tightened articles (such as the mechanical equipments) will be affected. Therefore, in order to find the tightening force/tightening torque applied to the threaded members for tightening the articles, conventionally, a sensor is disposed on the bolt or the screw. When the articles are tightened with the bolt/screw, the sensor can detect the deformation of the bolt to achieve the tightening force/tightening torque applied to the bolt. In this case, an operator can control the tightening force applied to the bolt to meet the requirement of high precision so as to ensure security.

The above technique is able to detect the deformation of the threaded member to find the tightening force applied to the threaded member according to the relationship between the deformation and the tightening force. The present invention provides another detection technique with different structural design for more clearly and precisely detecting the stress change so as to more precisely find the tightening extent of the threaded member and enhance the precision of the tightening extent of the threaded member.

SUMMARY OF THE INVENTION

It is therefore a primary object of the present invention to provide a threaded member capable of detecting extension force/tension. At least one receiving recess is formed on the surface of the thread of the threaded member. The receiving recess is adjacent to the surface of the thread. Accordingly, when a tightened article is tightened by the threaded member, the sensor member disposed in the receiving recess can precisely detect the extension force/tension applied to the threaded member in the axial direction.

To achieve the above and other objects, the threaded member capable of detecting tension of the present invention has an axial direction. The thread is formed on the threaded member in the axial direction of the threaded member. The threaded member includes at least one receiving recess formed on a circumferential surface of the thread of the threaded member and at least one sensor member disposed in the receiving recess for detecting tension applied to the threaded member in the axial direction.

When a tightened article is tightened by the threaded member, an extension force/tension is applied to the threaded member in the axial direction. The sensor member is positioned in adjacency to the thread of the threaded member so that the sensor member can precisely detect the extension extent of the threaded member in the axial direction for precisely obtaining the tightening force applied to the threaded member and enhancing the precision of the tightening extent of the threaded member.

The present invention can be best understood through the following description and accompanying drawings, wherein:

DETAILED DESCRIPTION OF THE PREFERRED EMBODIMENTS

Figure 1:
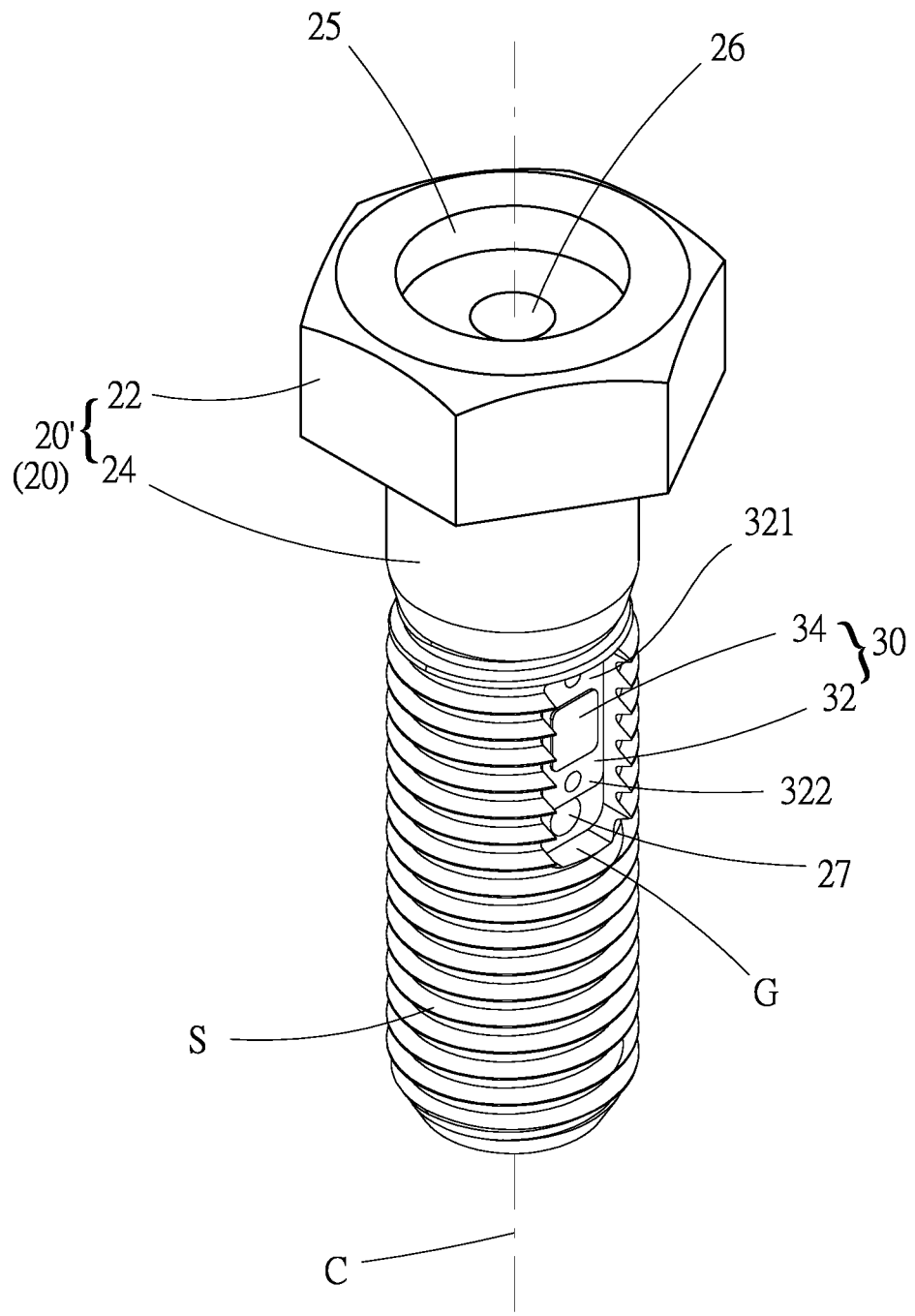
FIG. 1 is a perspective view of a first embodiment of the threaded member of the present invention.
Figure 2:
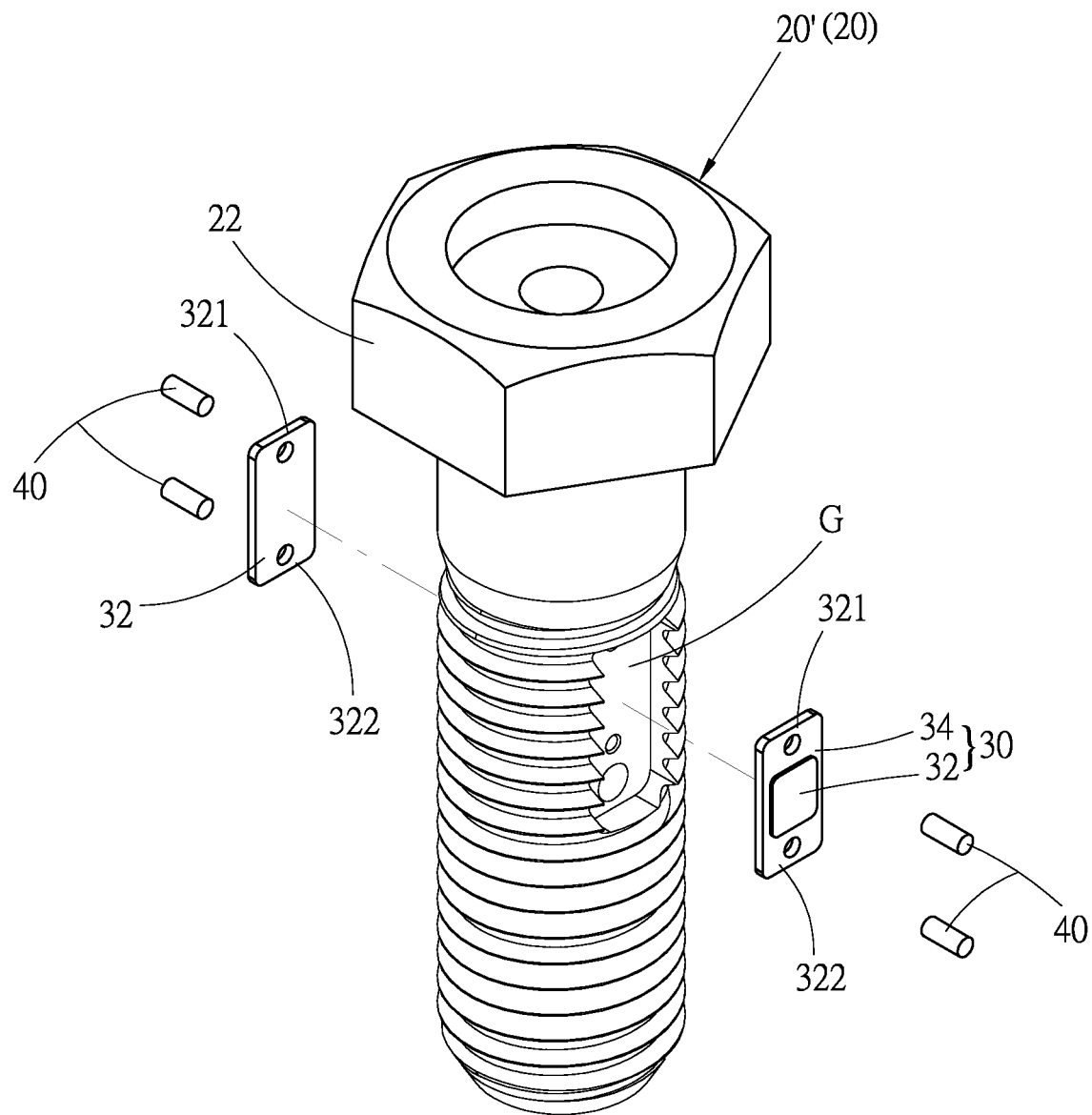
FIG. 2 is a perspective exploded view according to FIG. 1.
Figure 3:
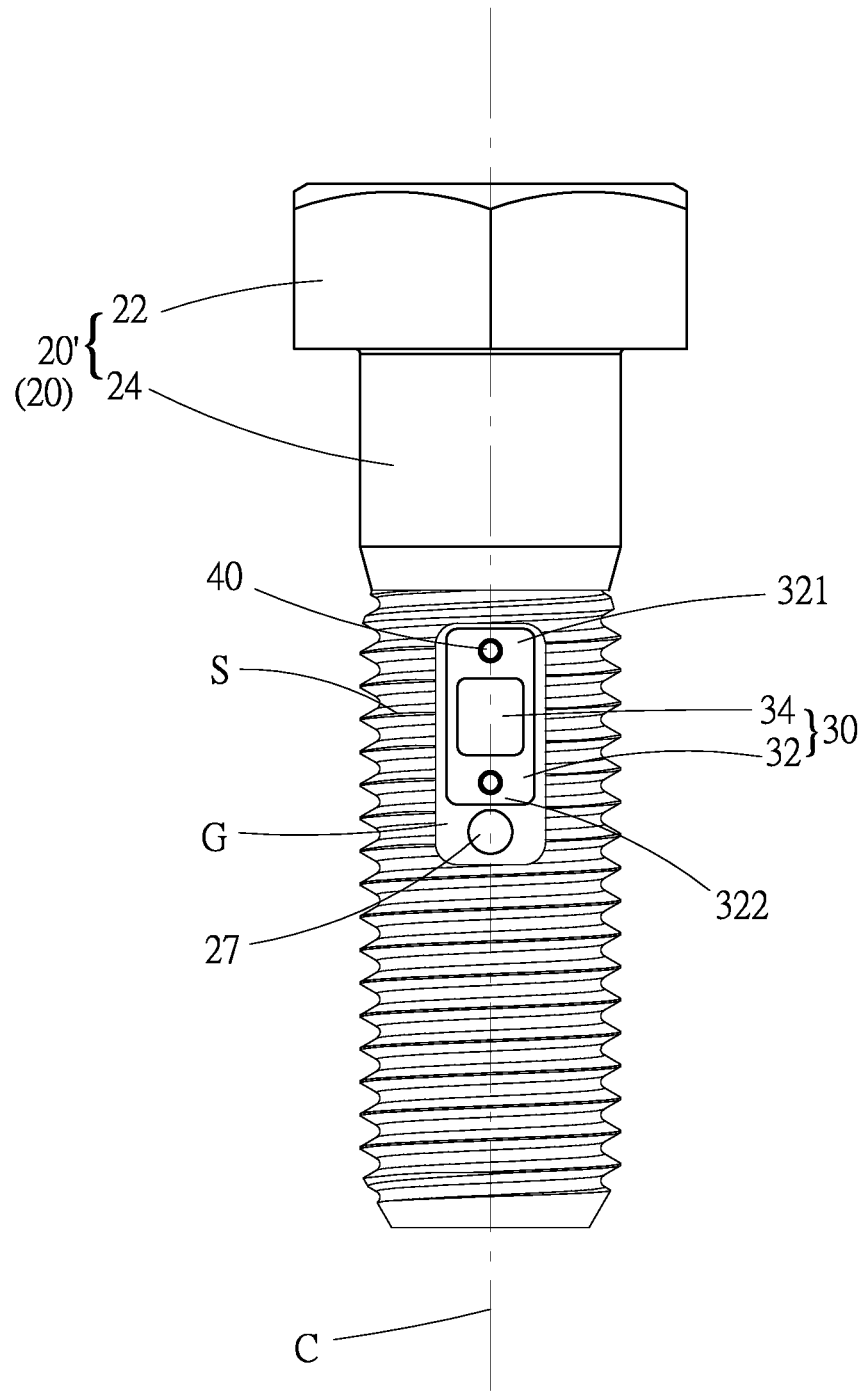
FIG. 3 is a front view according to FIG. 1.

Please refer to FIGS. 1 to 5. According to a first embodiment, the threaded member 20 of the present invention includes a sensor member 30 for detecting the extension state and tension of the threaded member 20. The threaded member 20 can be a bolt or a nut or any other threaded member that can be screwed and tightened. In this embodiment, the threaded member 20 is a bolt 20' as an example. The bolt 20' has a head section 22 and a stem section 24 disposed under a bottom face of the head section 22. A hand tool such as a wrench can be fitted onto or engaged with the head section 22 to wrench the threaded member. The configuration of the head section 22 is not limited to that of this embodiment. The head section 22 can be made with different configurations in adaptation to different types of wrenches or the like. A thread S is formed on a circumference of the stem section 24. The bolt 20' has an axial direction C along the longitudinal direction of the stem section. The thread S is formed on the circumference of the stem section 24 in the axial direction C of the bolt 20'.

In this embodiment, two (or one) receiving recesses G are formed on the circumference of the thread S of the stem section 24 in the axial direction C in adjacency to the surface of the thread S. The two receiving recesses G are opposite to each other at 180-degree intervals. The wall face of each receiving recess has an upper end and a lower end in the axial direction C. The length between the upper and lower ends is larger than the width of the receiving recess. The longitudinal direction of the receiving recess G is parallel to the axial direction C of the bolt 20'.

The sensor member 30 is received in the receiving recess G. The sensor member 30 has an extension element 32 and a sensor 34. The extension element 32 is extendible and preferably in the form of a plate or a board (such as a metal plate or a metal board). The extension element 32 is sensitively extendible and disposed on the wall face of the receiving recess G by means of adhesion or attachment. Alternatively, as in this embodiment, two ends 321, 322 of the extension element 32 are fixedly disposed in the receiving recess G by means of two fixing members 40 respectively. Accordingly, the extension element 32 has two extension ends 321, 322 in the axial direction C corresponding to two longitudinal ends of the receiving recess G. It should be noted that the receiving recess G is adjacent to the surface of the thread S. Therefore, when the thread S is forced and extended, the receiving recess G will precisely respond to the deformation of the thread S. The sensor 34 is disposed on the extension element 32 for detecting the extension change of the extension element 32 in the receiving recess G. The sensor 34 can be a tension gauge, a strain gauge or a sensor with a sensation chip. The sensor can wiredly or wirelessly transmit the detected data by way of, but not limited to, infrared, Bluetooth, electromagnetic wave or the like.

Figure 4:
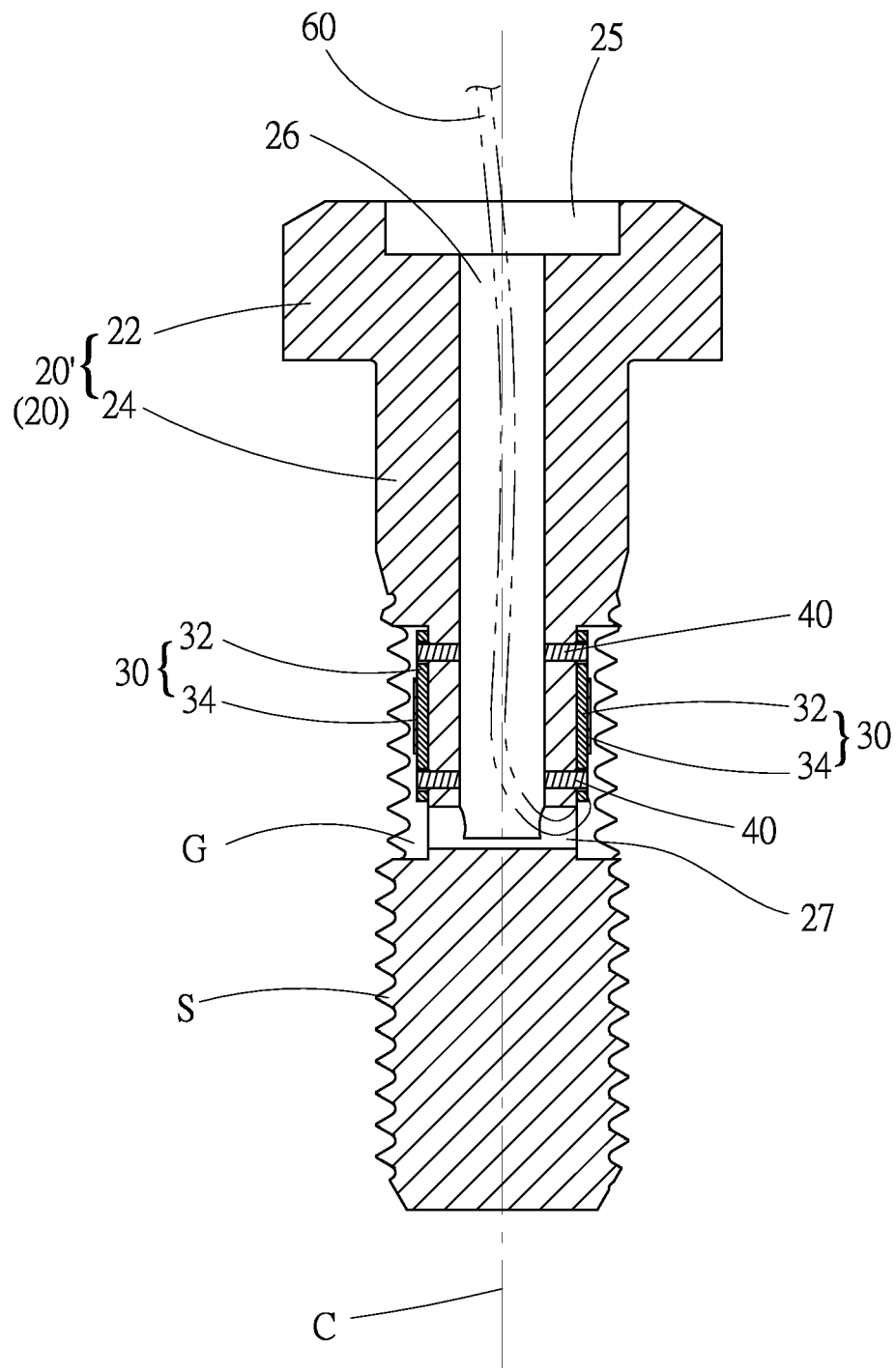
FIG. 4 is a longitudinal sectional view according to FIG. 1.

Please now refer to FIG. 4. In this embodiment, with wired transmission taken as an example, the bolt 20' is formed with a passage 26 inward extending from a top face of the head section 22 to the stem section 24 in the axial direction C. The stem section 24 is formed with at least one through hole 27 in communication with the passage 26 and the receiving recesses G. In addition, a depression 25 is formed on the top face of the head section 22. Accordingly, at least one wire 60 can be conducted through the passage 26 and the through hole 27 to connect with the sensor members 30, whereby the data of the sensor members 30 can be wiredly transmitted via the wire 60.

Figure 5:
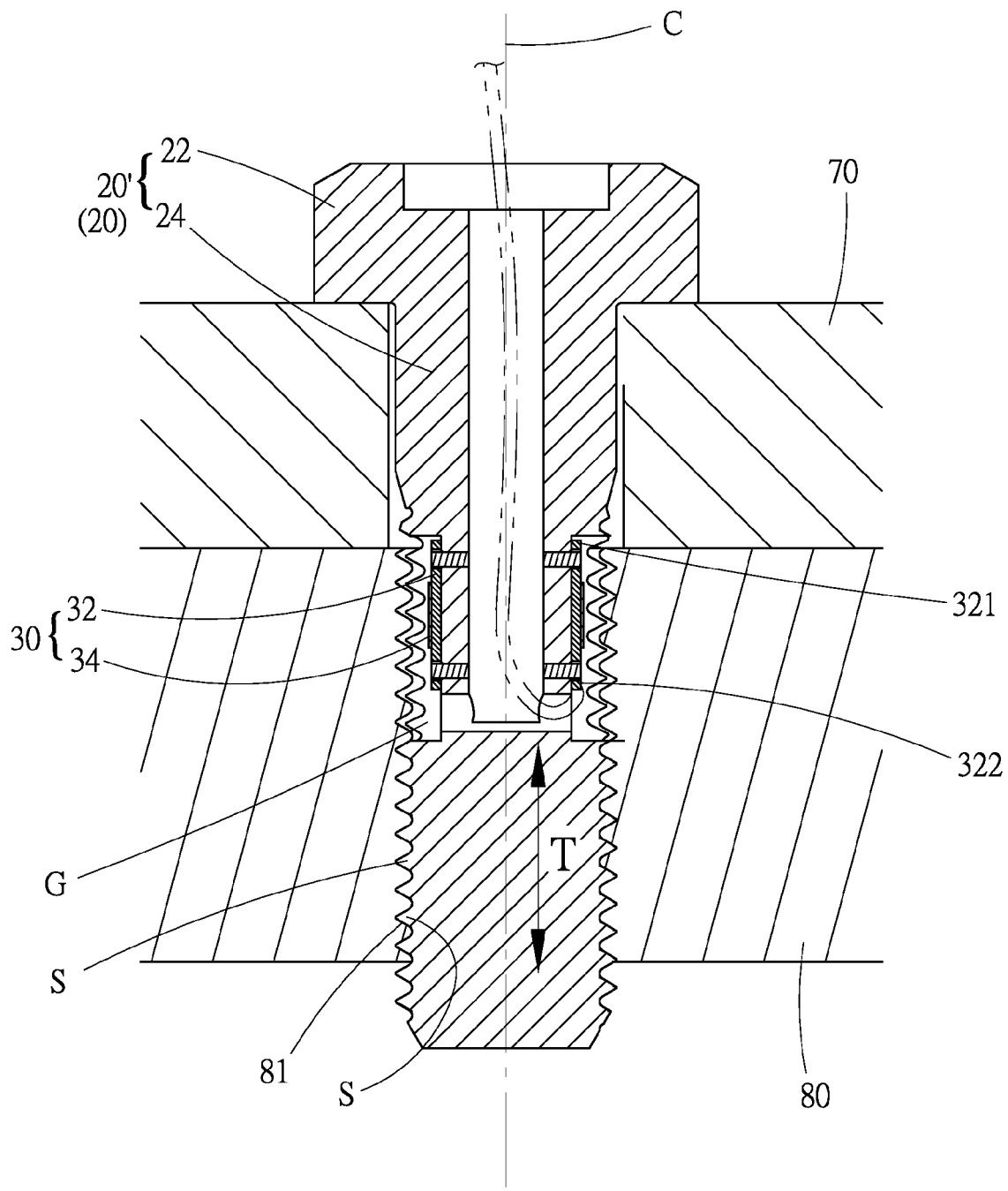
FIG. 5 is a sectional view showing that a tightened article is tightened with the first embodiment of the threaded member of the present invention.
Figure 6:
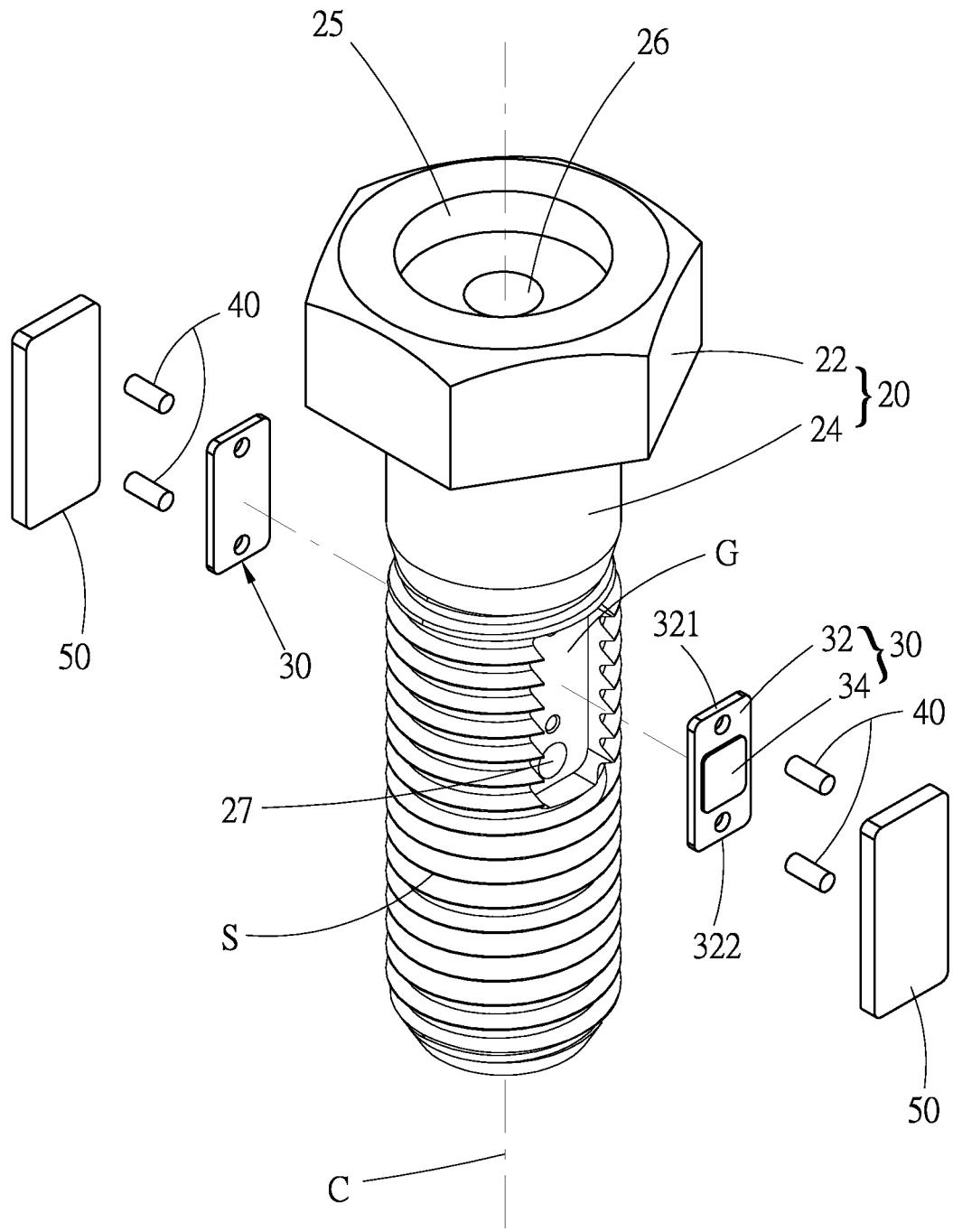
FIG. 6 is a perspective view of the first embodiment of the threaded member of the present invention in another aspect.

Please refer to FIG. 5, which shows the use state of the first embodiment of the present invention. As shown in FIG. 5, the stem section 24 of the bolt 20' is passed through a through hole of a tightened article 70 and screwed into a threaded hole of a base seat 80 (or a nut). When the bolt 20' is screwed and tightened, the head section 22 abuts against the tightened article 70. The thread S of the stem section 24 tightly contacts and engages with the thread 81 of the base seat 80. Under such circumstance, the bolt 20' is extended in the axial direction C. The extension force/tension T is in direct proportion to the tightening force applied to the bolt 20'. At this time, the extension element 32 is also extended along with the bolt 20'. With respect to the extension response of the bolt, the extension of the outer circumference, (that is, the thread S) of the bolt is more obvious than the interior of the bolt. The receiving recesses G are adjacent to the thread S so that the stress change of the extension force/tension T of the bolt 20' in the axial direction C can be truly and precisely reflected. In this case, the extension element 32 of the sensor member 30 is synchronously extended to present the change of the extension force/tension T. The sensor 34 can immediately detect the change of the extension force/tension T of the two ends 321, 322 of the extension element 32 in the axial direction C and convert the change of the extension force/tension T into the tightening force applied to the bolt 20' and wiredly or wirelessly transmit the tightening force to an external device (not shown) for an operator to truly and precisely know the tightening force applied to the bolt 20' so as to enhance the precision of the tightening extent. In the present invention, the sensor 34 is positioned in a position nearest to the thread S to detect the tension of the threaded member so that the detected value is more precise. Moreover, the conversion of the tension of the bolt 20' into the tightening force is directly completed by the sensor 34 or performed by a receiver. After the bolt 20' is tightened, the operator can know the tightening extent of the bolt 20' and monitor whether the tightening force of the bolt is changed. Please refer to FIG. 6. In the first embodiment, a protective cover 50 can be received in each receiving recess G to seal the sensor member 30 for providing dust-proof, anti-contamination and damp-proof effect.

Figure 7:
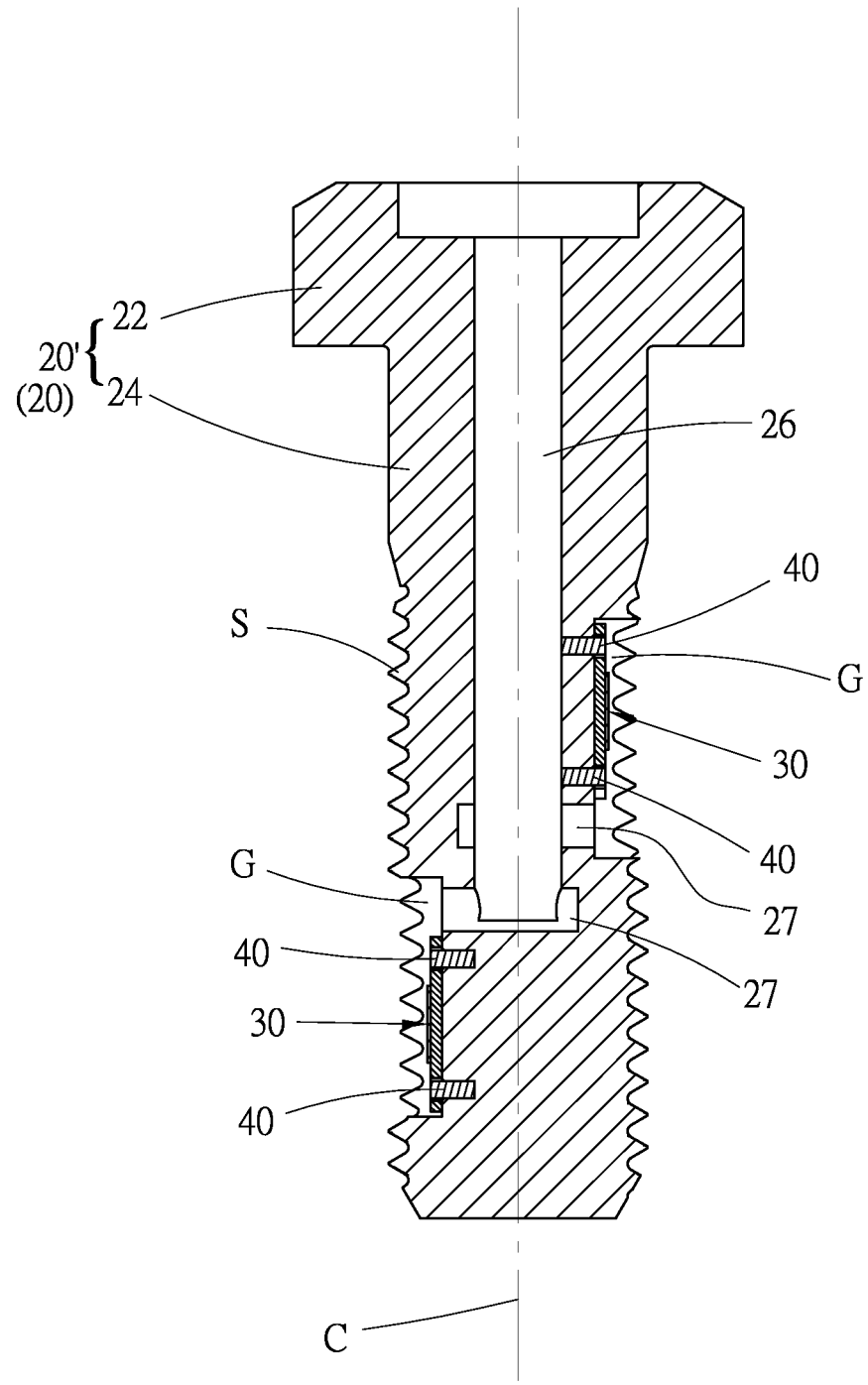
FIG. 7 is a sectional view of a second embodiment of the threaded member of the present invention.

Please now refer to FIG. 7, which shows a second embodiment of the threaded member of the present invention. In this embodiment, the threaded member is a bolt 20' as an example. The bolt 20' is formed with two receiving recesses G formed on the thread S of the stem section 24. The two receiving recesses G are formed on the stem section 24 in the axial direction C and positioned at different heights. Two sensor members 30 are disposed in the upper and lower receiving recesses G in different positions. As in the first embodiment, after the bolt 20' is tightened, the sensor members 30 in different positions can detect the extension force/tension of the bolt 20' (threaded member 20) in the axial direction C at different heights so as to truly and precisely obtain the tightening force applied to the bolt 20'.

Figure 8:
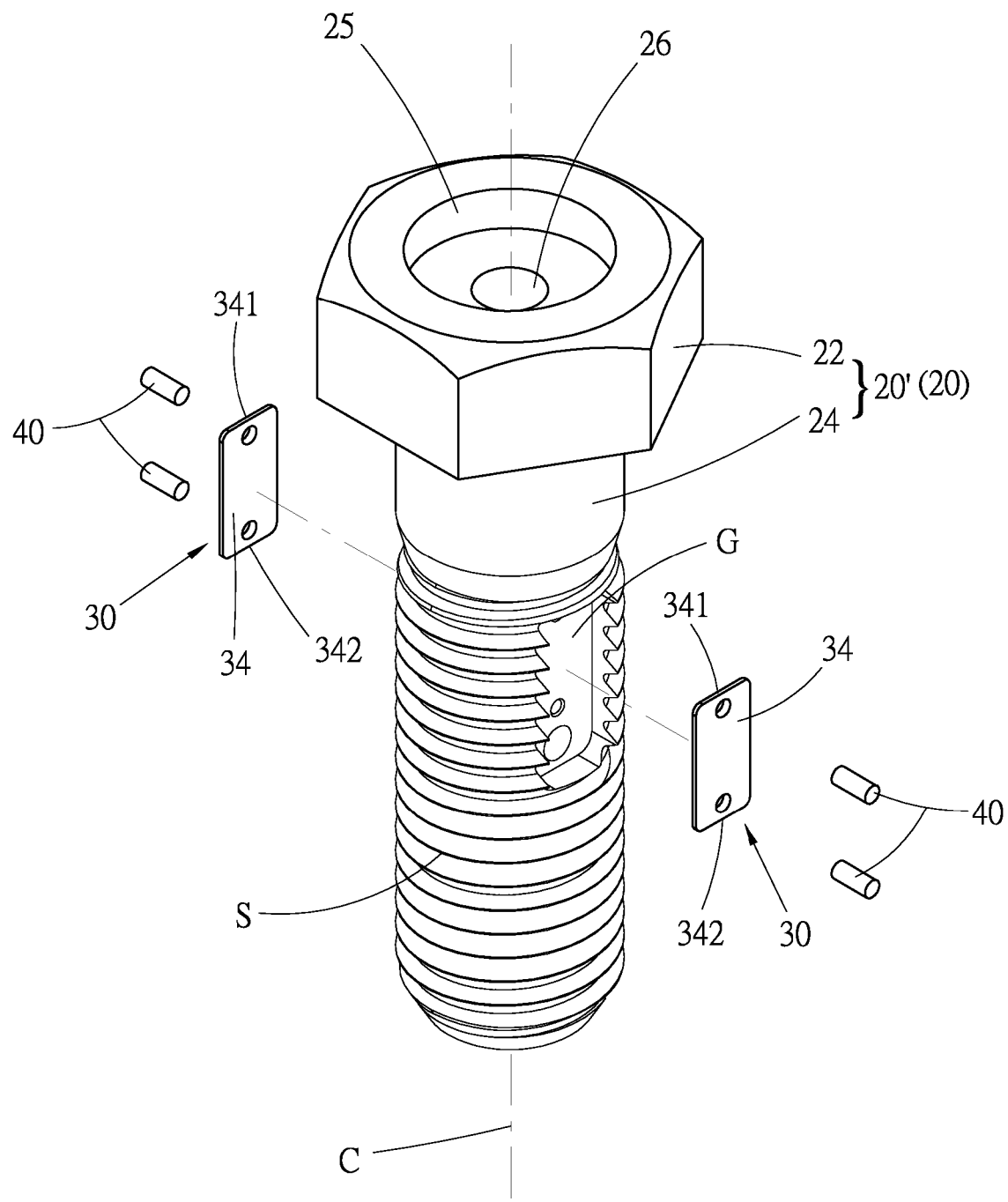
FIG. 8 is a perspective exploded view of a third embodiment of the threaded member of the present invention.

Please now refer to FIG. 8, which shows a third embodiment of the threaded member of the present invention. In this embodiment, the threaded member is also a bolt 20' as an example. The third embodiment is different from the first embodiment in that the sensor member 30 only has a sensor 34. The sensor 34 is disposed on the wall face of the receiving recess G by means of adhesion or attachment. Alternatively, two ends of the sensor are fixedly disposed in the receiving recess G by means of two fixing members 40 respectively. Accordingly, the sensor 34 has two extension ends 341, 342 in the axial direction C. When the bolt is extended, the sensor 34 is also extended along with the bolt 20' to detect the tension applied to the threaded member. The sensor 34 can be a tension gauge, a strain gauge or a sensor with a sensation chip. The sensor can wiredly or wirelessly transmit the detected data.

As in the first embodiment, after the thread S of the stem section 24 of the bolt 20' is tightened, an extension force/tension is applied to the bolt 20' in the axial direction. The extension force/tension is in direct proportion to the tightening force applied to the bolt 20'. At this time, the sensor 34 can precisely and clearly detect the change of the extension force/tension of the bolt in the axial direction C and convert it into the tightening force applied to the bolt 20' and wiredly or wirelessly transmit the tightening force to an external device (not shown) for an operator to truly and precisely know the tightening force applied to the bolt 20'.

Figure 9:
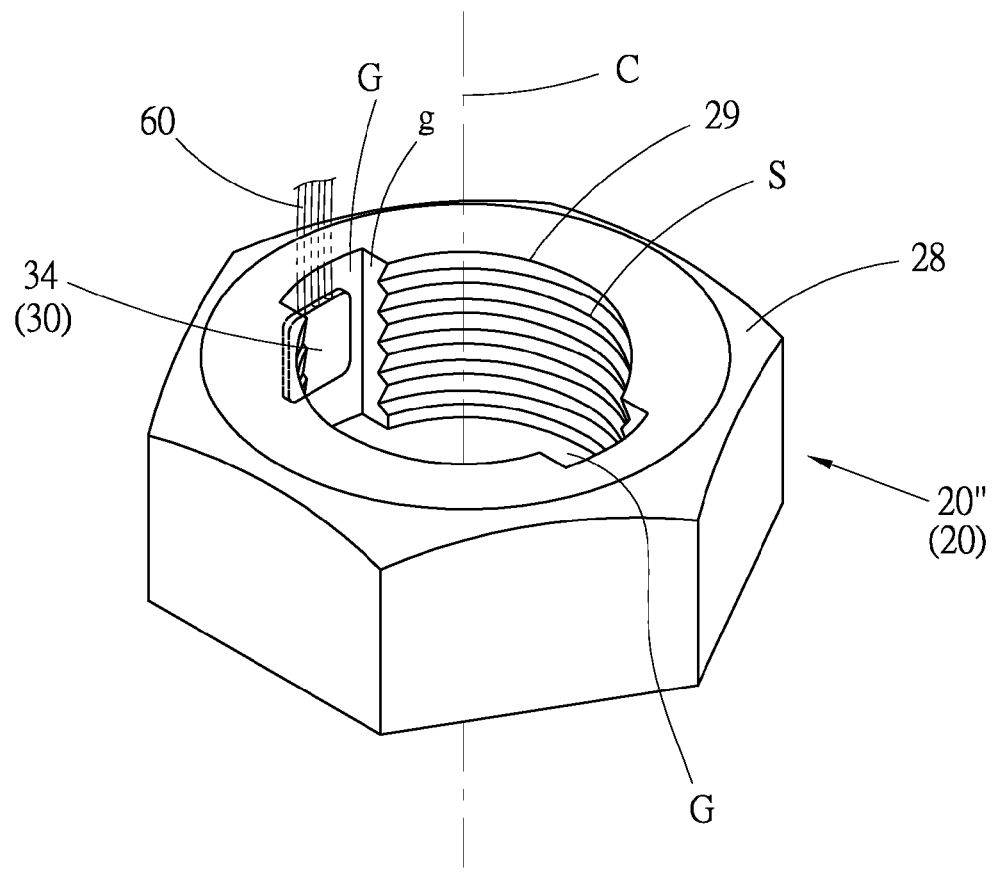
FIG. 9 is a perspective view of a fourth embodiment of the threaded member of the present invention.
Figure 9A:
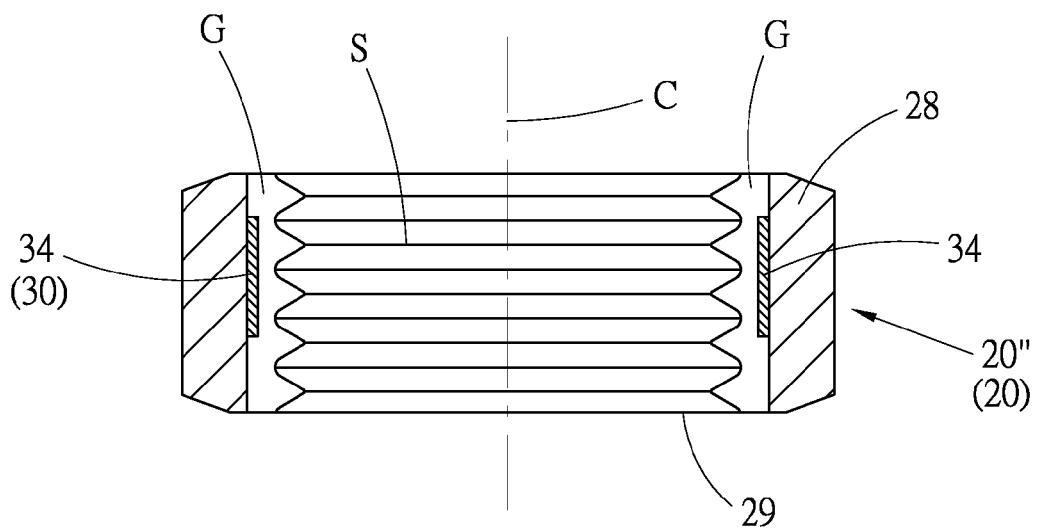
FIG. 9A is a sectional view according to FIG. 9.

Please now refer to FIGS. 9 and 9A, which show a fourth embodiment of the threaded member of the present invention. In this embodiment, the threaded member is a nut 20" as an example. The nut 20" has a main body 28 and a threaded hole 29 formed in the main body 28. A hand tool such as a wrench can be fitted onto or engaged with the main body 28 to wrench the threaded member. The configuration of the main body 28 is not limited to that of this embodiment. The main body 28 can be made with different configurations in adaptation to different types of wrenches or the like. The threaded member 20 has an axial direction C coinciding with the axial direction of the threaded hole 29. The thread S is formed on a wall of the threaded hole 29 in the axial direction C of the threaded member. One or two receiving recesses G are formed on the circumferential surface of the thread S of the threaded hole 29. The longitudinal direction of the receiving recesses G is parallel to the axial direction C. The sensor members 30 are disposed on the bottom faces of the receiving recesses G by means of adhesion or attachment. The sensor member 30 is a sensor 34, which can be connected with a wire 60 to transmit data or wirelessly transmit data. In addition, as shown in FIG. 9, in this embodiment, one end of the receiving recess G extends to an end face of the main body 28, whereby at least one end of the receiving recess G is formed as an open end g. The wire 60 connected with the sensor member 30 is conducted through the open end g to outer side of the nut 20".

Accordingly, as in the first embodiment, after a tightened article is tightened by the nut 20" in cooperation with a bolt, the thread S of the threaded hole 29 is forced and an extension force/tension is applied to the nut in the axial direction C. The extension force/tension is in direct proportion to the tightening force applied to the nut. At this time, the sensor members 30 can directly detect the change of the extension force/tension of the nut 20" in the axial direction C to obtain the tightening force applied to the nut 20". The thread S of the threaded hole 29 is a section of the nut 20", which section is extended and deformed to a maximum extent. The receiving recesses G are disposed on the thread S so that the sensor members 30 can precisely detect the extension force/tension applied to the nut.

In the case that the sensor 34 is directly disposed in the receiving recess G, the sensor itself can directly detect the extension change of the threaded member 20 (bolt or nut).

Figure 10:
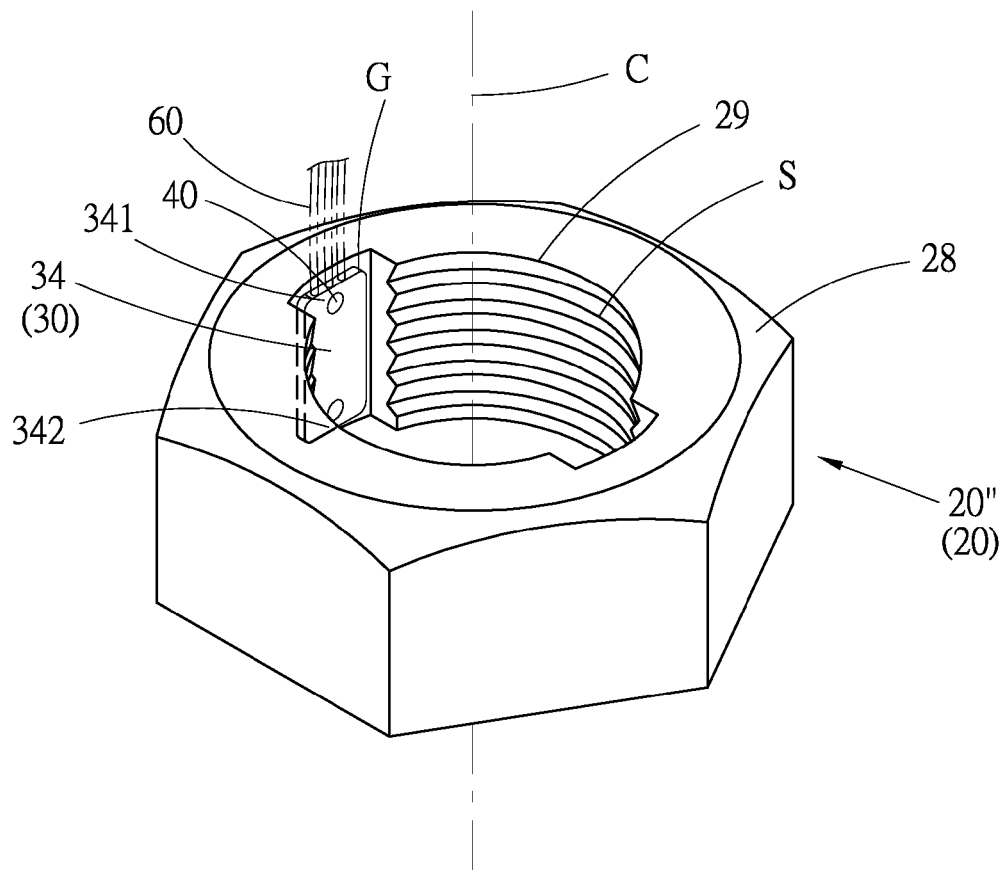
FIG. 10 is a perspective view of a fifth embodiment of the threaded member of the present invention.
Figure 10A:
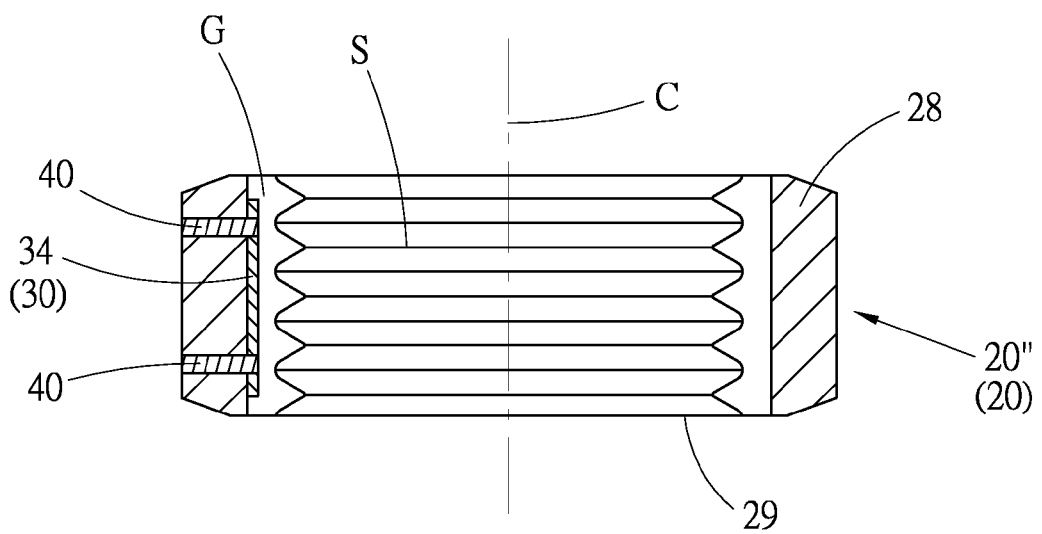
FIG. 10A is a sectional view according to FIG. 10A.

Please now refer to FIGS. 10 and 10A, which show a fifth embodiment of the threaded member of the present invention. In this embodiment, the threaded member is also a nut. The fifth embodiment is different from the fourth embodiment in that the sensor member 30 is a sensor 34. The two ends of the sensor 34 in the axial direction C are respectively formed as two extension ends 341, 342 corresponding to two longitudinal ends of the receiving recess G. The two extension ends 341, 342 of the sensor 34 are fixed by two fixing members 40 respectively.

As in the first embodiment, when a tightened article is tightened by the nut 20", the thread S of the threaded hole 29 is forced and an extension force/tension is applied to the nut in the axial direction C. The extension force/tension is in direct proportion to the tightening force applied to the nut. At this time, the two extension ends 341, 342 of the sensor 34 of the sensor member 30 are extended, whereby the sensor 34 can detect the extension force/tension of the nut 20" in the axial direction C and convert the extension force/tension into the tightening force applied to the but 20" and wiredly (such as with the wire 60) or wirelessly transmit the tightening force to an external device for an operator to obtain the tightening force applied to the nut.

Figure 11:
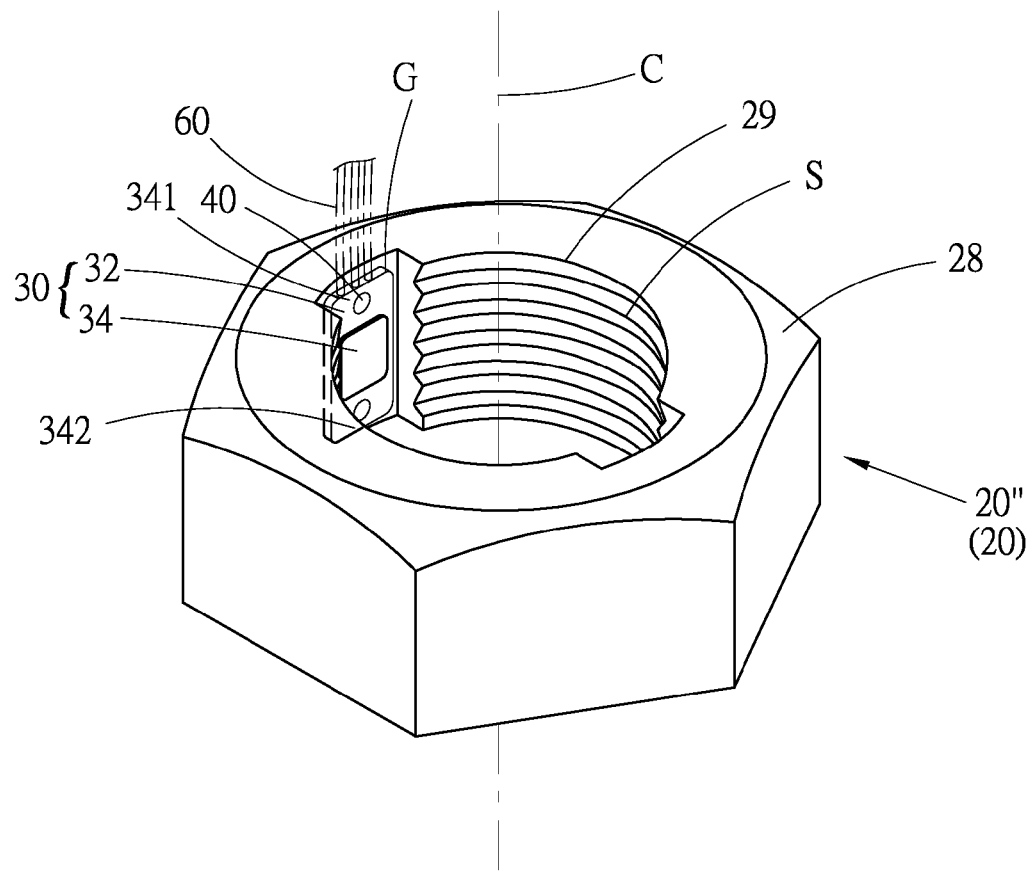
FIG. 11 is a perspective view of a sixth embodiment of the threaded member of the present invention.
Figure 11A:
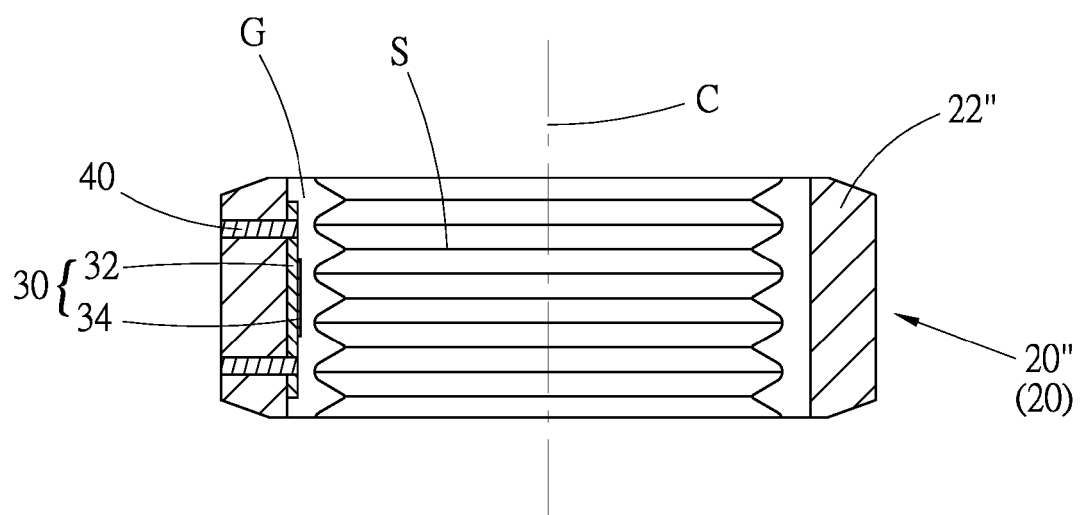
FIG. 11A is a sectional view according to FIG. 11A.

Please now refer to FIGS. 11 and 11A, which show a sixth embodiment of the threaded member of the present invention. In this embodiment, the threaded member is also a nut. The sixth embodiment is different from the fifth embodiment in that the sensor member 30 has an extension element 32 and a sensor 34 disposed on the extension element 32. The extension element 32 is sensitively extendible and adhered in the receiving recess G. Alternatively, two ends 321, 322 of the extension element 32 are fixedly disposed in the receiving recess G by means of two fixing members 40 respectively. In the axial direction C, the extension element 32 is extended along with the extension of the nut. The sensor can detect the extension change of the extension element.

When a tightened article is tightened by the nut 20", the thread S of the threaded hole 29 is forced and an extension force/tension is applied to the nut in the axial direction C. The extension element 32 is extended along with the extension of the nut in the axial direction C, whereby the sensor 34 can detect the change of the extension force/tension of the extension element to obtain the tightening force applied to the nut.

In the threaded member capable of detecting tension of the present invention, at least one receiving recess is formed on the thread of the threaded member, which is extended and deformed to a maximum extent. At least one sensor member is disposed in the receiving recess in adjacency to the surface of the thread for precisely detecting the extension force/tension applied to the threaded member so as to obtain the tightening force applied to the threaded member. Accordingly, the precision of the tightening extent of the threaded member can be enhanced.

The above embodiments are only used to illustrate the present invention, not intended to limit the scope thereof. Many modifications of the above embodiments can be made without departing from the spirit of the present invention.

What is claimed is:

1. A threaded member capable of detecting tension, the threaded member having an axial direction, a thread being formed on the threaded member in the axial direction of the threaded member; the threaded member comprising:
   at least one receiving recess formed on a circumferential surface of the thread of the threaded member, the thread of the threaded member being located on an outer perimeter of each of the at least one receiving recess; and
   at least one sensor member correspondingly fixed in the receiving recess for directly detecting tension applied to the threaded member in the axial direction;
   wherein the sensor member has an extension element and a sensor, the extension element of the sensor being directly connected to a wall face of the receiving recess and the thread of the threaded member being located on an outer perimeter of each of the at least one sensor member and the sensor member directly detecting tension applied to the threaded member, the sensor being located on the extension element;
   wherein two opposing ends of the extension element are fixedly connected to the wall face of the receiving recess in the axial direction of the threaded member.

2. The threaded member capable of detecting tension as claimed in claim 1, wherein the threaded member is a bolt having a head section and a stem section connected with the head section, the axial direction of the threaded member coinciding with an axial direction of the stem section; the thread being formed on a circumference of the stem section; the receiving recess being formed on the thread of the stem section.

3. The threaded member capable of detecting tension as claimed in claim 2, wherein the threaded member has at least two receiving recesses formed on the thread of the stem section, the receiving recesses being positioned at different heights; at least two sensor members being respectively disposed in the receiving recesses.

4. The threaded member capable of detecting tension as claimed in claim 2, wherein the threaded member is formed with a passage inward extending from a face of the head section to the stem section; the stem section being formed with at least one through hole in communication with the passage and the receiving recesses.

5. The threaded member capable of detecting tension as claimed in claim 1, wherein the threaded member has at least two receiving recesses positioned at different heights; at least two sensor members being respectively disposed in the receiving recesses.

6. The threaded member capable of detecting tension as claimed in claim 1, wherein the threaded member is a nut having a main body and a threaded hole formed in the main body; the axial direction of the threaded member coinciding with an axial direction of the threaded hole; the thread being formed on a wall of the threaded hole; the receiving recess being formed on the thread of the threaded hole.

7. The threaded member capable of detecting tension as claimed in claim 6, wherein one end of the receiving recess extends to an end face of the main body to form an open end.

8. The threaded member capable of detecting tension as claimed in claim 1, wherein the sensor member serves to wiredly or wirelessly transmit detected data.

\* \* \* \* \*